United States Patent [19]

Comber

[11] 4,321,458

[45] Mar. 23, 1982

[54] SETBACK DEVICE

[76] Inventor: William R. Comber, Rte. 3, Box 100, New London, N.C. 28127

[21] Appl. No.: 235,756

[22] Filed: Feb. 18, 1981

[51] Int. Cl.$^3$ .............................................. H05B 1/02
[52] U.S. Cl. .................................... 219/511; 219/493; 219/220; 219/483; 337/104; 337/107; 337/377; 337/304; 236/46 R
[58] Field of Search .............. 219/511, 483, 508, 220, 219/492, 434, 493; 337/102, 104, 107, 377, 304; 236/68 B, 46 R, 46 F

[56] References Cited

U.S. PATENT DOCUMENTS

| | | | |
|---|---|---|---|
| 3,147,466 | 9/1964 | Stacy | 219/483 X |
| 3,834,618 | 9/1974 | Buckwalter | 219/511 |
| 4,014,500 | 3/1977 | Galtz | 236/68 B |
| 4,035,752 | 7/1977 | Anderson | 219/511 |
| 4,171,769 | 10/1979 | Trimpey | 236/68 B |

Primary Examiner—B. A. Reynolds
Assistant Examiner—M. Paschall
Attorney, Agent, or Firm—W. Thad Adams, III

[57] ABSTRACT

The invention relates to an electric temperature setback device which is placed in proximate relation to a conventional thermostat and is operatively controlled by a timing device for providing local warmth to the thermostat at pre-determined times and for pre-determined intervals. The setback device includes spades with integral female lamp connectors for arraying a plurality of incandescent lamps in series across an electrical circuit. By so doing, the voltage to each lamp is proportionally reduced, decreasing the filament temperature of each lamp and thereby increasing the amount of heat energy produced proportional to the amount of light energy produced.

3 Claims, 5 Drawing Figures

SETBACK DEVICE

BACKGROUND OF THE INVENTION

This invention relates to an electric temperature setback device used to control a thermostat at pre-determined times and for pre-determined intervals.

Recent emphasis on saving energy and reducing expenditures for fuel has resulted in the development of many new devices for adjusting the temperature setting on a heating system thermostat. By regulating the setting of the thermostat, the heating system can be made to raise a building temperature to a pre-determined, relatively high level, during periods of occupancy and lower the temperature during other times. For example, a setback device on a thermostat in a residential dwelling can be set so as to lower the temperature substantially during the nighttime hours while the occupants are asleep. The thermostat can be programmed to raise the temperature to a more comfortable level shortly before they awake. If the dwelling is empty during the day while its occupants are at work or in school, as is often the case, the setback device can be set to again lower the temperature within the dwelling during the day and then raise the temperature to a more comfortable level in the late afternoon shortly before the occupants return. The dwelling is kept at this relatively warm temperature during the early evening hours and until the occupants again retire, completing the daily cycle. Depending on the sophistication of the unit, temperatures can be adjusted to differing levels and control for longer periods of time.

One way in which this setback ability has been accomplished is the substitution of a conventional thermostat with a much more expensive unit containing a built-in timer and means for setting the temperature which will be maintained by the thermostat during various intervals. Some of these units are operated by batteries, while other units require running 110 volt AC service to the thermostat outlet in addition to the usual low voltage service. These units are relatively expensive and require replacement of the existing thermostat. In addition, extra wiring is sometimes required.

Another type of device used to set back a thermostat involves the use of a local heat source which is connected to a timer. The heat source is placed in close proximity to the thermostat (usually below it) and permits a flow of air past the heat source into the sensing zone of the thermostat. By providing this local warmth, the thermostat itself need not be adjusted. Rather, the thermostat senses this local warmth and maintains the heating system in an "off" condition. Of course, the air temperature in the dwelling is thus permitted to drop to a level substantially below what the thermostat itself reads. Many of these units also have a built-in timer for controlling the intervals during which the heat source is providing warmth to the thermostat.

Other devices are also provided with adjustment means, such as rheostats, so that the warmth provided to the thermostat can be controlled, thereby varying the extent to which the temperature is permitted to drop. While these devices are generally less expensive than the combination thermostat-timer type and permit the continued use of an existing thermostat, many have numerous moving parts and are therefore still relatively expensive. Other devices, while more simple, use one or more incandescent light sources which provide, in addition to heat, a relatively high percentage of unnecessary and undesirable light.

So far as is known, no simple and inexpensive device has heretofore been devised which can be adapted for use with a conventional thermostat and which will efficiently provide sufficient heat to set back a thermostat, when desired, to a pre-determined level.

SUMMARY OF THE INVENTION

Accordingly, it is an object of this invention to provide an electric temperature setback device for being placed in proximate relation to a conventional thermostat. The setback device is operatively controlled by a conventional timing device for providing local warmth to a thermostat at pre-determined times and for pre-determined intervals. The setback device according to this invention includes the improvement which comprises arraying a plurality of incandescent light sources in series across an electrical circuit for reducing the voltage and decreasing the filament temperature of each light source. As a result, the amount of heat energy produced proportional to the amount of light energy produced is increased and creates a more efficient heat source.

It is another object of this invention to provide a setback device having a single unit, molded body which is very inexpensive to manufacture.

It is another object of this invention to provide a setback device which is provided with one-piece AC receptacle spades having a female connector receptacle on one end for receiving a conventional incandescent lamp base.

BRIEF DESCRIPTION OF THE DRAWINGS

Some of the objects and advantages of the invention have been set forth above. Other objects and advantages will appear as the description of the invention proceeds, when taken in conjunction with the following drawings in which.

DESCRIPTION OF THE PREFERRED EMBODIMENT

Figure 1:
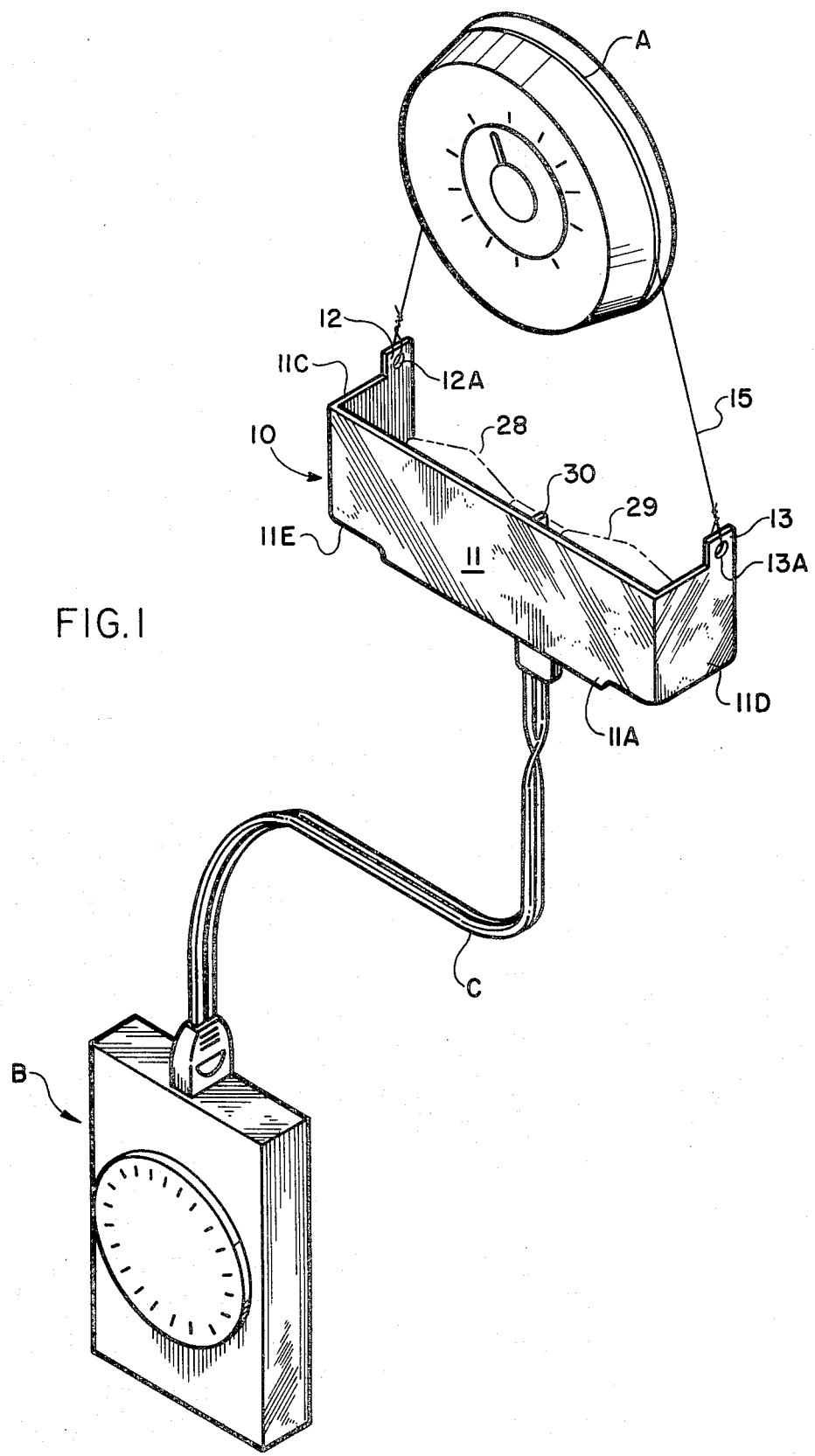
FIG. 1 is a perspective view of a preferred embodiment of the setback device according to the present invention, electrically connected to a conventional timer and suspended beneath a conventional thermostat.

Referring now specifically to the drawings, a setback device according to a preferred embodiment of the invention is shown and indicated at broad reference numeral 10. Setback device 10 is suspended beneath a thermostat A, and is electrically connected to a conventional timer B by means of an AC electrical cord C. Timer B is preferably of a type ordinarily used to turn lights off and on, and is plugged into a conventional 110 volt AC electrical outlet (not shown). Still referring to FIG. 1, the setback device 10 according to the present invention comprises an upwardly opening enclosure 11 formed of a high-impact plastic or some other inexpensive, non-electrically conducting material. The enclosure 11 includes front and rear walls 11a and 11b, respectively, opposing end walls 11c and 11d, respectively, and a bottom wall 11e. Integrally formed in end walls 11c and 11d closely adjacent rear wall 11b are upwardly extending tabs 12 and 13 containing through holes 12a and 13a, respectively. A cord 15 is knotted through holes 12 and 13a and is passed over the top surface of thermostat A as is shown in FIG. 1, thereby suspending the setback device 10 directly below the thermostat. As is apparent, the length of the cord 15 can be adjusted, thereby varying the distance below the thermostat A that the setback device 10 is suspended. As is also apparent, the setback device 10 can be suspended from thermostats having a wide variety of sizes and shapes.

Figure 2:
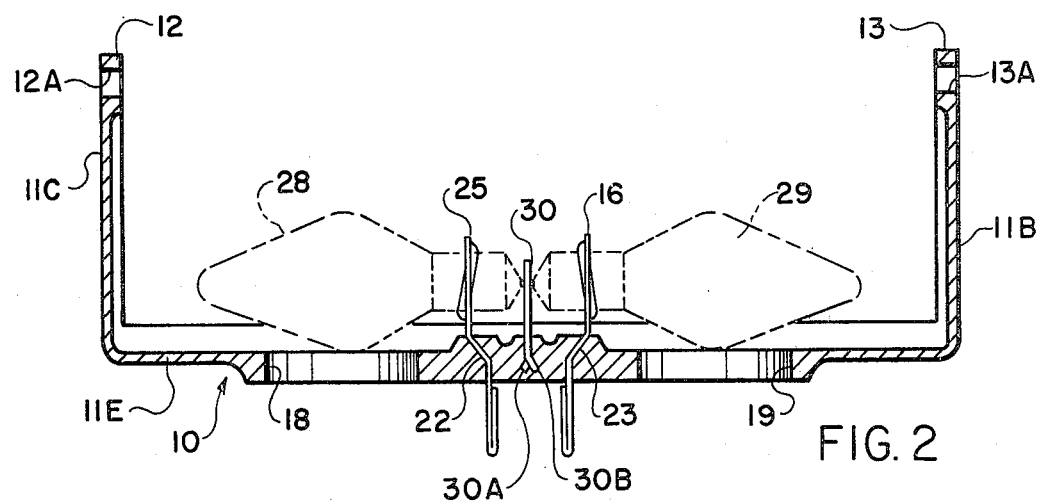
FIG. 2 is a vertical, cross-sectional view of the setback device shown in FIG. 1.
Figure 3:
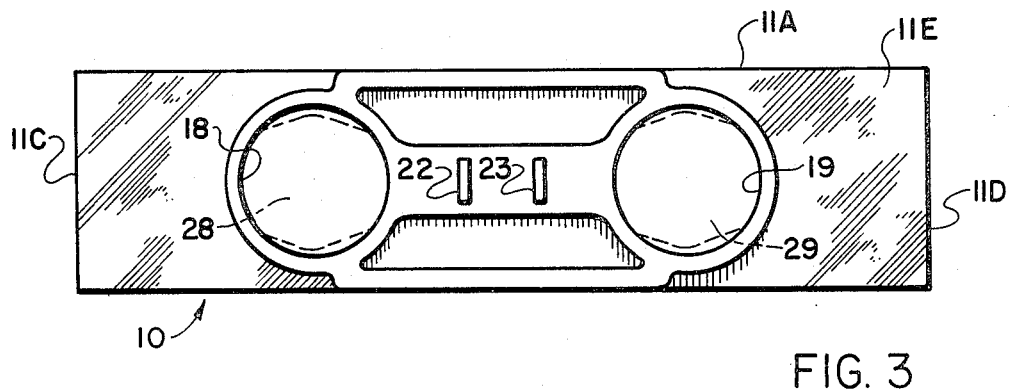
FIG. 3 is a plan view of the bottom of the setback device.
Figure 4:
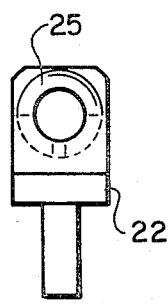
FIG. 4 is a plan view of an AC receptacle spade according to a preferred embodiment of the present invention; and, FIG. 5 is an electrical circuit diagram of the setback device.
Figure 5:
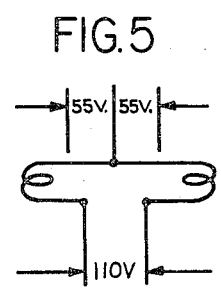

Referring now to FIG. 2, the setback device 10 is shown in cross-section. Bottom wall 11e of enclosure 11 is provided with two spaced-apart air convection holes 18 and 19 for permitting the upward flow of air. As can be seen in FIG. 2, the medial portion of bottom wall 11e is somewhat thicker in cross-section and provides strength and flexive resistance. Molded into and extending through the medial portion of bottom wall 11e are two electrically conductive spades 22 and 23. Integrally formed on one end of spades 22 and 23 and extending into the enclosure 11 of the setback device 10 are female connectors 25 and 26, respectively. These female connectors are commonly referred to as Tinnerman-type nuts and have a single spiral thread with an angle corresponding to the thread angle of the lamps used, as described below. Tinnerman-type nuts (FIG. 4) are conventionally stamped from electrically conductive metal, such as copper, and are therefore very inexpensive to manufacture. Female connectors 25 and 26 are each intended to receive a conventional incandescent lamp, such as a "nite-lite" lamp or a Christmas tree lamp having a rated output of approximately 7 watts at 110 volts. Lamps 28 and 29 are shown positioned in female connectors 25 and 26, respectively. The spades 22 and 23 extend outwardly from bottom wall 11e and are spaced apart so as to mate with a standard 110 volt AC female plug. To complete the electrical connection in series, a single conductor strip 30 is mounted in the non-conductive material comprising bottom wall 11e, intermediate receptacle spades 22 and 23. As is also shown in FIG. 2, the conductor strip 30 has outwardly projecting ears 30a and 30b which are embedded in bottom wall 11e and prevent the conductor strip 30 from being pulled loose. Conductor strip 30 extends upwardly and separates the bases of lamps 28 and 29. As lamps 28 and 29 are screwed inwardly towards each other through female connectors 25 and 26, they each touch conductor strip 30 with the tip of their respective bases and create a series connection therebetween. This connection is shown in the form of an electrical circuit diagram in FIG. 5.

When the timer B activates the setback device 10, lamps 28 and 29 begin to heat. By heating air in proximity to the lamps 28 and 29, this air is caused to rise upwardly through the top opening of the setback device 10. This upward convection of air causes additional air to be drawn in through the air convection holes 18 and 19. This process is continuous, so that a steady supply of warm air is directed by convection into proximity with the sensing zone of the thermostat A. The setback device 10 can be adjusted very simply by shortening or lengthening the cord 15 so that it is moved closer to or further from the thermostat A. Or, given an assumed sensitivity of a conventional thermostat, the correct distance of the setback device 10 below the thermostat required to lower the ambient room temperature by a certain amount can be determined empirically prior to manufacture, and appropriate marks placed on the cord 15 so that adjustment can be made by the consumer without undue experimentation.

In accordance with the invention, the placing in series of the lamps 28 and 29 splits the available voltage. The reduced voltage available to each lamp causes a decrease in the temperature of the filament. As a general rule, the lower the filament temperature the greater the proportion of heat which is released relative to the amount of light given off.

At its normal operating temperature in a parallel connection 15% of the available energy is given off by an incandescent lamp as visible light and the remainder as infrared, or heat, energy. As the temperature of the filament is raised the percentage of total energy given off as light increases. In an extreme case where the filament is heated to destruction, as in a flashbulb, a much higher percentage of energy is converted into light, albeit for a very short period of time. Conversely, as the filament temperature is lowered, more of the available energy is converted into infrared energy. Of course, since the total amount of energy available is lower, the amount of heat in absolute terms is also lower, but higher in proportion to the amount of light given off.

Therefore, arraying lamps 28 and 29 in series provides a number of benefits. First, the life of the lamps is dramatically increased. Secondly, since the amount of heat given off by the lamps is less in absolute terms, the setback device 10 can be positioned in closer proximity to the thermostat. This results in the air flow to the thermostat being more even, and of a sufficient width to bathe the entire thermostat in warm air. The closer proximity to the thermostat also makes it less likely that other air currents in the immediate vicinity could divert the flow of warmed air laterally away from its sensing zone.

Finally, since so much less light is being given off with the lamps 28 and 29 wired in series the setback device is much less obtrusive at night when the other lights in the dwelling are out.

All of these advantages are obtained despite the very inexpensive and simple construction. By minimizing the number of parts while at the same time increasing efficiency, the setback device is much more apt to be purchased and used by people desiring to conserve energy but who are unwilling or unable to spend a relatively larger sum on replacement thermostats with built-in timers.

Described above is an improved setback device which is inexpensive to construct and efficient to operate. Various details of the invention as described above may be changed without departing from the scope of the invention. Furthermore, the foregoing description is for the purpose of illustration only and not for the purpose of limitation—the invention being defined by the claims.

I claim:

1. In an electric temperature setback device for being placed in proximate relation to a conventional thermostat and for being operatively controlled by a timing device for providing local warmth to the thermostat at pre-determined times and for pre-determined intervals, the improvement which comprises means for arraying two incandescent light sources in series across an electrical circuit for reducing the voltage and decreasing the filament temperature of each light source, thereby increasing the amount of heat energy produced proportional to the amount of light energy produced and thereby creating a more efficient heat source, said means for arraying said two light sources in series comprising:

(a) an enclosure for partially enclosing said two light sources and including openings spaced therein for directing heat upwardly in a pre-determined manner towards the thermostat, said enclosure including a non-conductive base;

(b) two electrically conductive spades mounted in appropriate spaced-apart relation through said base and projecting beyond the outer surface of said enclosure for being received in a conventional alternating current female electrical plug, said two spades each having an integral female connector positioned on the inner side of said base within said enclosure and having a central annular opening therein for receiving the light source; and, (c) means for completing electrical interconnection in series between said two light sources.

2. In an electric temperature setback device according to claim 1, wherein said means for completing electrical interconnection in series between said two light sources comprises a single conductor strip mounted in said non-conductive base and extending into electrical contact with each of said two light sources.

3. In an electrical temperature setback device according to claim 1, wherein each light source comprises a lamp and wherein the annular opening defined by each of said electrically conductive spades has at least one thread for mating, screw thread engagement with the base of said lamps.

* * * * *